(12) United States Patent  (10) Patent No.: US 7,743,903 B2
Nakanishi  (45) Date of Patent: Jun. 29, 2010

(54) PANEL FEEDING DEVICE, PANEL FEEDING METHOD, AND PANEL ASSEMBLING DEVICE

(75) Inventor: Tomoaki Nakanishi, Saga (JP)

(73) Assignee: Panasonic Corporation, Osaka (JP)

( * ) Notice: Subject to any disclaimer, the term of this patent is extended or adjusted under 35 U.S.C. 154(b) by 595 days.

(21) Appl. No.: 11/317,017

(22) Filed: Dec. 27, 2005

(65) Prior Publication Data

US 2006/0154551 A1    Jul. 13, 2006

(30) Foreign Application Priority Data

Dec. 27, 2004    (JP)    ............... 2004-376072

(51) Int. Cl.
*B65G 43/08*    (2006.01)
(52) U.S. Cl. .............. 198/346.2; 198/626.1; 198/626.2
(58) Field of Classification Search .............. 198/626.1, 198/626.2
See application file for complete search history.

(56) References Cited

U.S. PATENT DOCUMENTS 3,650,871 A * 3/1972 Bentfors .................. 156/269
4,282,049 A * 8/1981 Morse .................... 156/62.2
4,382,500 A * 5/1983 Oyama et al. ............. 198/346
5,562,197 A * 10/1996 Vaphiadis ................ 198/776

FOREIGN PATENT DOCUMENTS

JP    8-330747 A    12/1996
JP    3239685    10/2001

* cited by examiner

*Primary Examiner*—Gene Crawford
*Assistant Examiner*—Kavel P Singh
(74) *Attorney, Agent, or Firm*—McDermott Will & Emery LLP

(57) ABSTRACT

A panel feeding device, panel feeding method, and panel assembling device are provided that are capable of stably conveying a large panel. On panel assembling where a display panel is assembled by joining substrate (7) to glass panel (5), in a panel feeding device that feeds glass panel (5) to a working position, a panel conveying means that conveys glass panel (5) is supported by a pair of placing tables (4), each moving along carrier rails, at both ends of the bottom surface, and substrate 7 bonded to glass panel (5) extending from glass panel (5) is supported by supporting members (24c) and (25c) provided extending from placing table (4). This makeup enables stably conveying a large panel.

6 Claims, 15 Drawing Sheets

PANEL FEEDING DEVICE, PANEL FEEDING METHOD, AND PANEL ASSEMBLING DEVICE

TECHNICAL FIELD

The present invention relates to a panel feeding device, panel feeding method, and panel assembling device, for conveying a panel such as a display panel to a working position where the process is performed by a processing device such as an application device, and for feeding the panel to the position.

BACKGROUND ART

A display panel such as a plasma display panel and a liquid crystal display panel used for a display of an electronic device is assembled by joining a driver board to the edge of a glass panel as a display screen through a connector such as a TCP (Tape Carrier Package). The panel assembling device performing this assembly process is equipped with a panel conveying mechanism that conveys a glass panel delivered from an upstream device, to the application device to feed the panel. As a conveying mechanism for conveying a panel such as a display panel, a method is known that holds the bottom surface of the panel by means of an arm-like holder to move the panel, such as in Japanese Patent No. 3239685. In this patent literature, a panel is held by means of a cantilever-shaped holding arm and moved along carrier rails for the panel to be moved in a straight line.

In recent years, with upsizing of display panels, the size and weight of a panel to be conveyed have been increased. With such increase in size and weight of a panel, a method that holds a panel by means of a cantilever-shaped holding arm as in the above-mentioned example causes the holding arm to be deformed downward due to the weight of the panel, making a stable conveyance difficult. Consequently, a panel conveying mechanism has been demanded capable of stably conveying a large panel.

SUMMARY OF THE INVENTION

Accordingly, an object of the present invention is to provide a panel feeding device, feeding method, and panel assembling device, these capable of stable conveyance for a large panel.

A panel feeding device according to the present invention is to feed a panel to a working position. The panel feeding device includes a panel conveying means for conveying a panel along a conveying path from a carry-in position to a delivery position; and a panel receiving and moving means for receiving the panel, being held by a panel holder, at the delivery position, and moving the panel to the working position. The panel conveying means is equipped with a pair of carrier rails disposed substantially in parallel with the conveying path; and a pair of panel placing parts, each provided movably along the pair of carrier rails and holding the bottom surface of the panel placed on the panel placing parts at both ends of the surface. The panel feeding device is equipped with a synchronously driving means for moving the pair of panel placing parts synchronously along the carrier rails. The panel receiving and moving means is equipped with a receiving operation part that has the panel holder hold the panel on the panel placing parts positioned at the delivery position, at the bottom surface of the panel, by moving the panel holder up, down, and horizontally, relatively to the pair of carrier rails.

The present invention uses a panel feeding method that feeds a panel to a working position. This method includes a panel conveying process that conveys a panel along a conveying path from a receiving position to a delivery position; and a panel receiving and moving process that receives the panel, being held by a panel holder, at the delivery position, and moves the panel to a working position. In the panel conveying process, a pair of panel placing parts are moved synchronously along the carrier rails, with the bottom surface of the panel being held at both ends thereof, by means of a pair of panel placing parts, each provided movably along a pair of carrier rails disposed substantially in parallel with the conveying path. Next, in the panel receiving and moving process. In the panel receiving and moving process, a panel receiving action is performed that has the panel holder hold the panel on the panel placing part positioned at the delivery position, at the bottom surface of the panel, by moving the panel holder up, down, and horizontally, relatively to the pair of carrier rails.

According to the present invention, a pair of panel placing parts, each movably provided along a pair of carrier rails disposed on the conveying path, are moved synchronously along the carrier rails, with the bottom surface of the panel being held at both ends thereof, thus allowing the panel to be conveyed stably.

The present invention uses a panel assembling device that assembles a display panel by joining a substrate to the panel. The panel assembling device is equipped with a joining means that joins a panel with a substrate; a panel conveying means that conveys a panel along a conveying path from a carry-in position to a delivery position; a panel receiving and moving means that receives the panel, being held by the panel holder, at the delivery position, and moves the panel to the working position for the joining means; and a substrate conveying means that conveys a substrate fed by a substrate feeder to the joining means. The panel conveying means is equipped with a pair of carrier rails disposed substantially in parallel with the conveying path. The panel assembling device is equipped with a pair of panel placing parts, each movably provided along a pair of carrier rails, holding the bottom surface of the panel placed on the top surface of the panel placing parts, at both ends of the bottom surface; and a synchronously driving means that moves the pair of panel placing parts synchronously along the carrier rails. The panel receiving and moving means moves the panel holder up, down, and horizontally, relatively to the pair of carrier rails. Consequently, the panel receiving and moving means is equipped with a receiving operation means that has the panel holder hold the panel on the panel placing parts positioned at the delivery position, at the bottom surface of the panel.

As a result that a makeup is used that moves a pair of panel placing parts synchronously along carrier rails, with the end of a workpiece being placed on the panel placing parts each provided movably along a pair of carrier rails disposed substantially in parallel with the conveying direction, the present invention provides a panel assembling device that stably conveys a panel.

REFERENCE MARKS IN THE DRAWINGS

Figure 1:
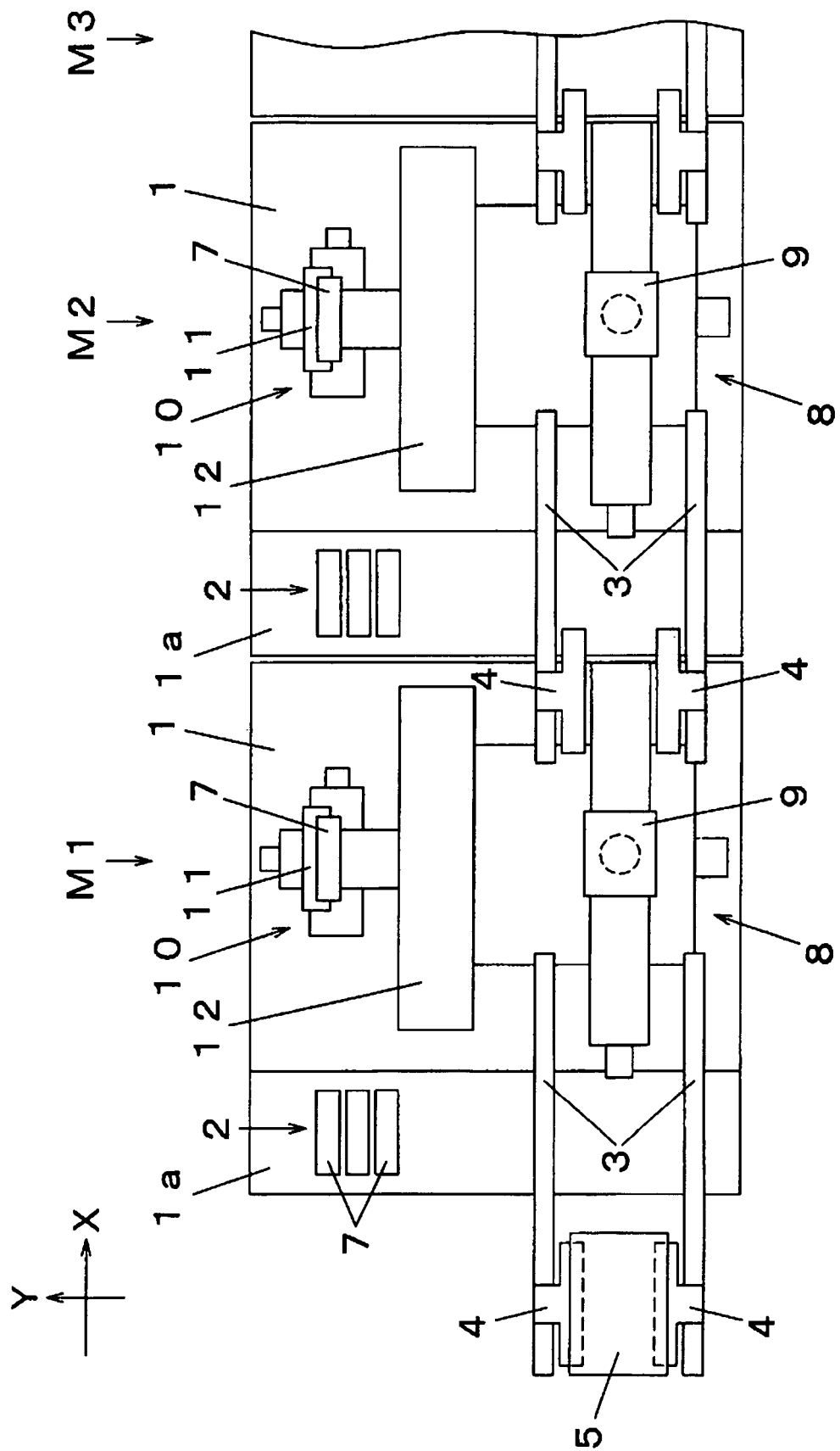
FIG. 1 is a plan view of a panel assembly line according to an exemplary embodiment of the present invention.

2 Part feeder
3 Panel conveying mechanism
4 Placing table
5 Glass panel
6 Connector
7 Substrate
8 Panel positioning table
9 Panel holder
10 Substrate positioning table
12 Crimp joint
24, 25 Substrate supporting part
24*c*, 25*c* Supporting member
34 Motor
M1 First panel assembling device
M2 Second panel assembling device
A100 Carry-in position
B100 Delivery position
C100 Standby position
D100 Working position

DETAILED DESCRIPTION OF PREFERRED EMBODIMENT EXEMPLARY EMBODIMENT

Figure 2:
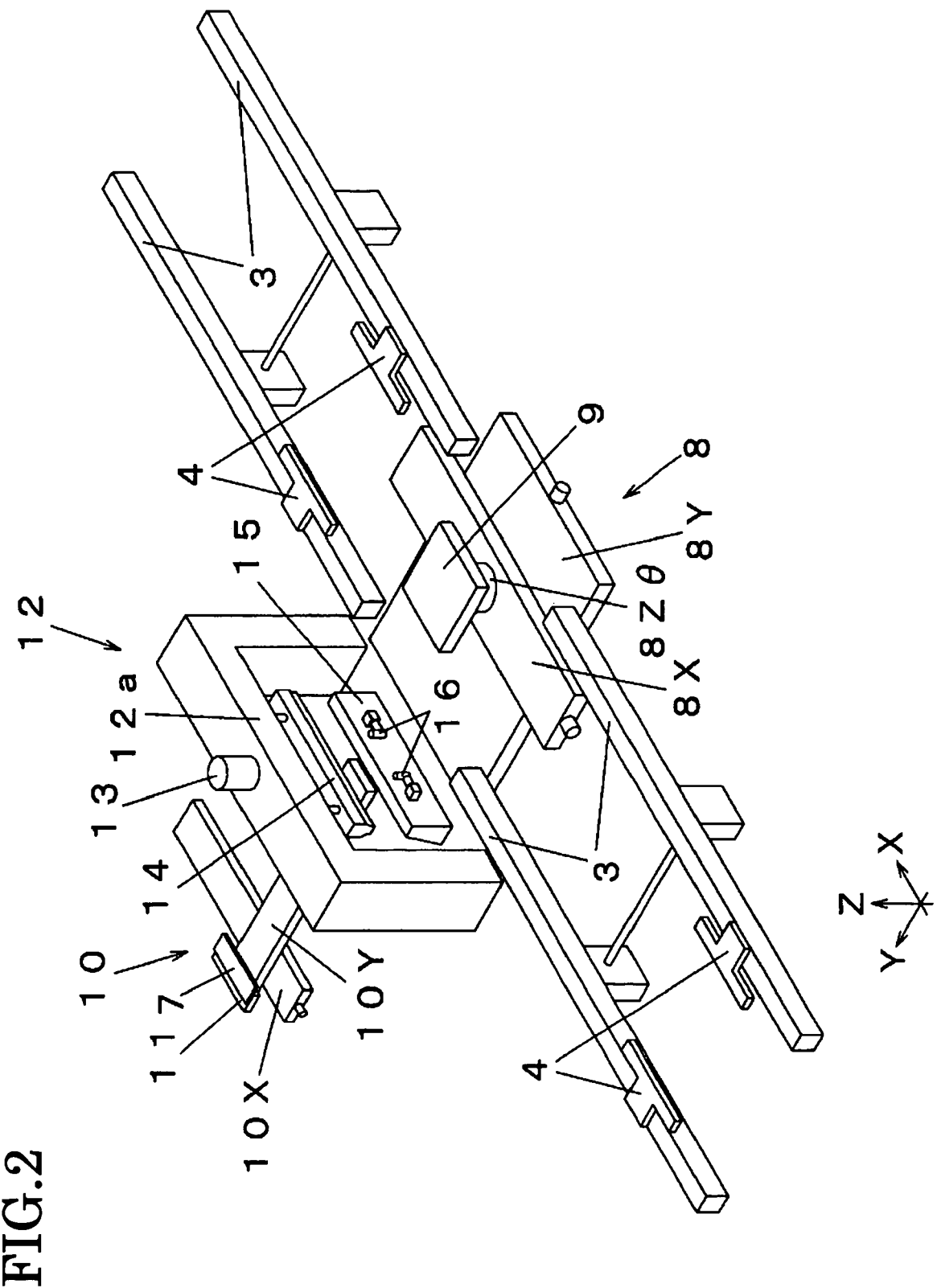
FIG. 2 is a perspective view of a panel assembling device according to an exemplary embodiment of the present invention.
Figure 3:
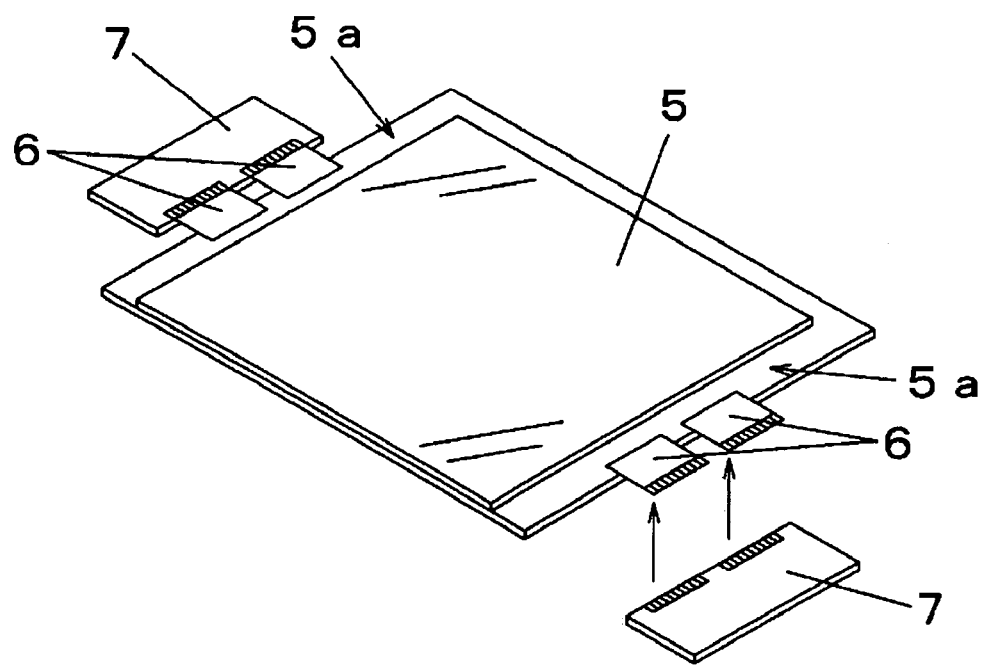
FIG. 3 is a perspective view of a display panel to be assembled by the panel assembling device according to an exemplary embodiment of the present invention.
Figure 4:
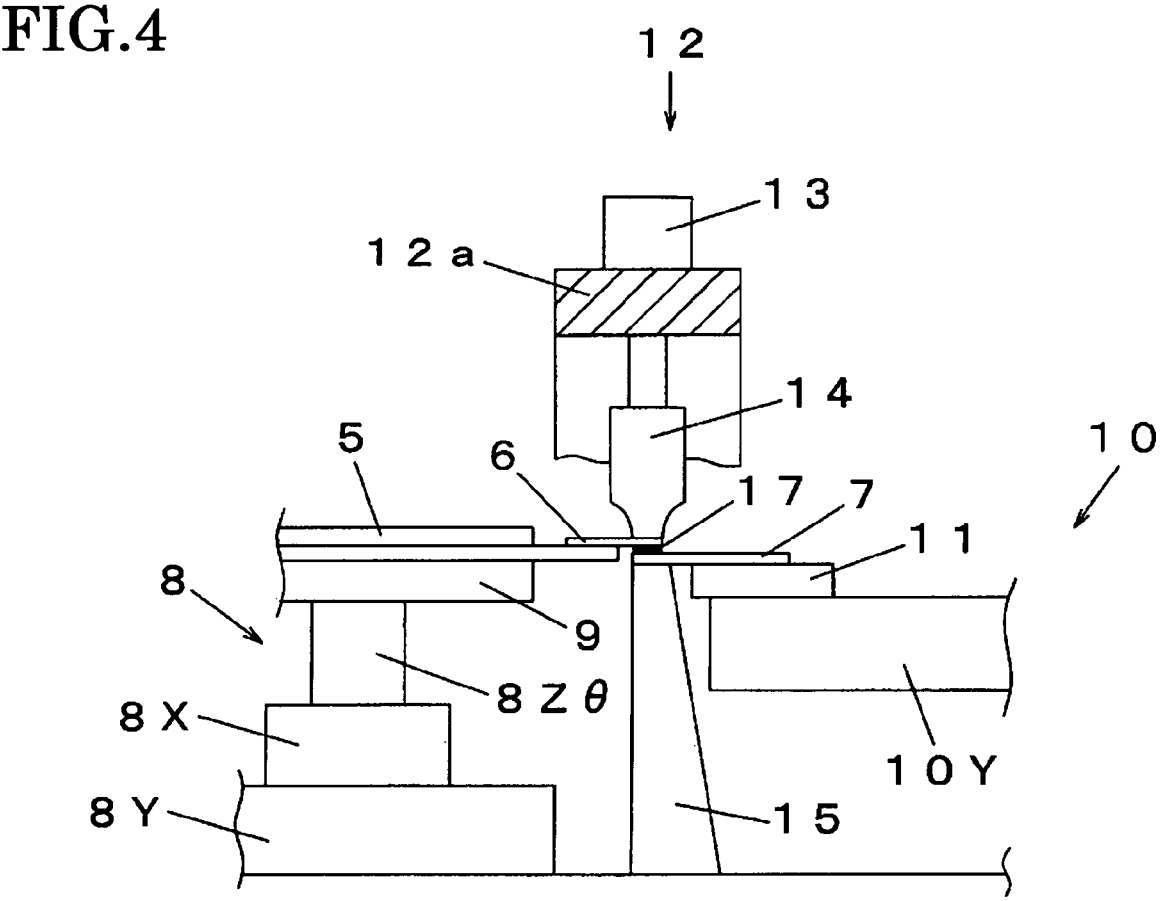
FIG. 4 is a partially sectional view of the panel assembling device according to an exemplary embodiment of the present invention.
Figure 5:
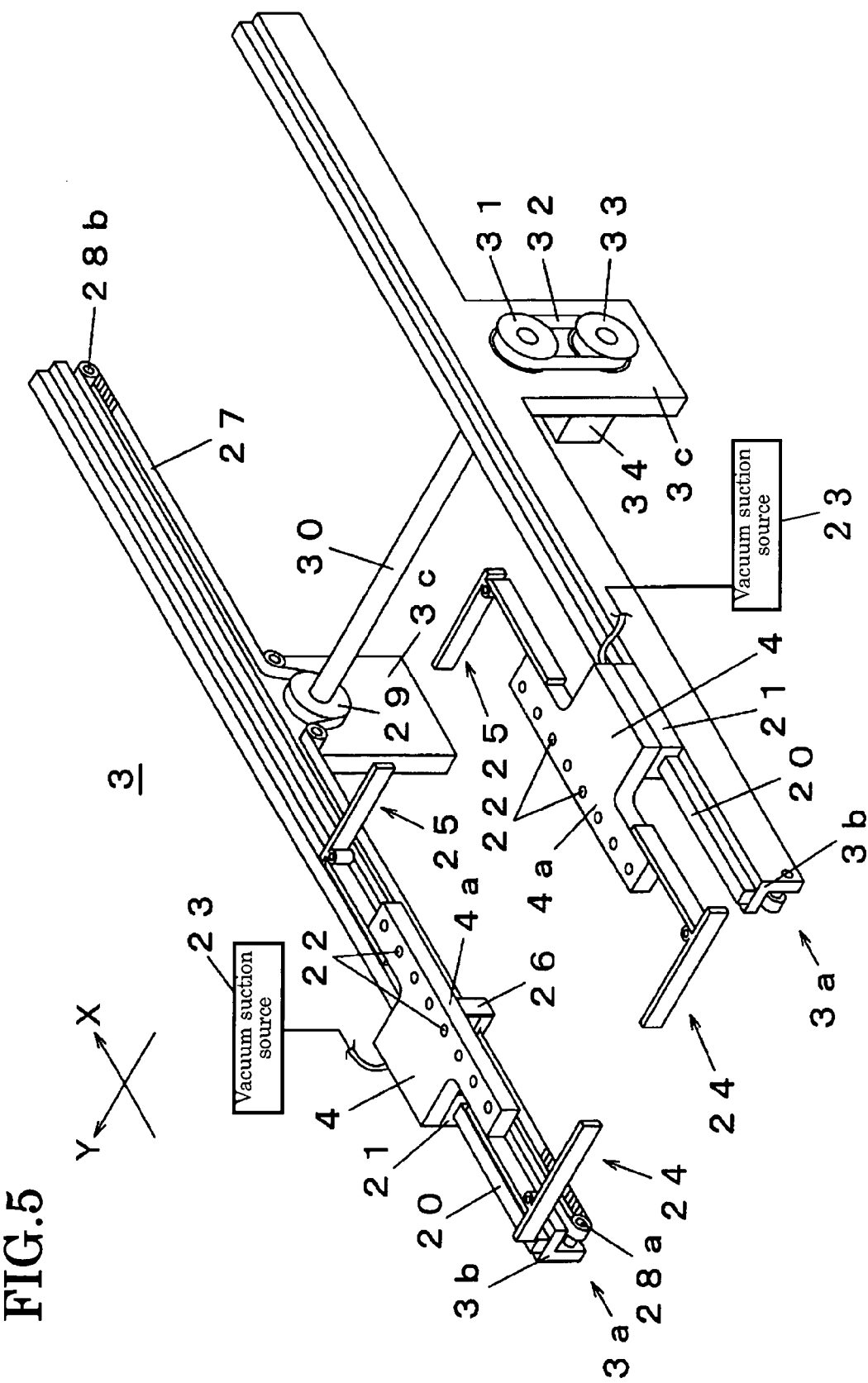
FIG. 5 is a perspective view of a panel conveying mechanism for the panel assembling device according to an exemplary embodiment of the present invention.
Figure 6:
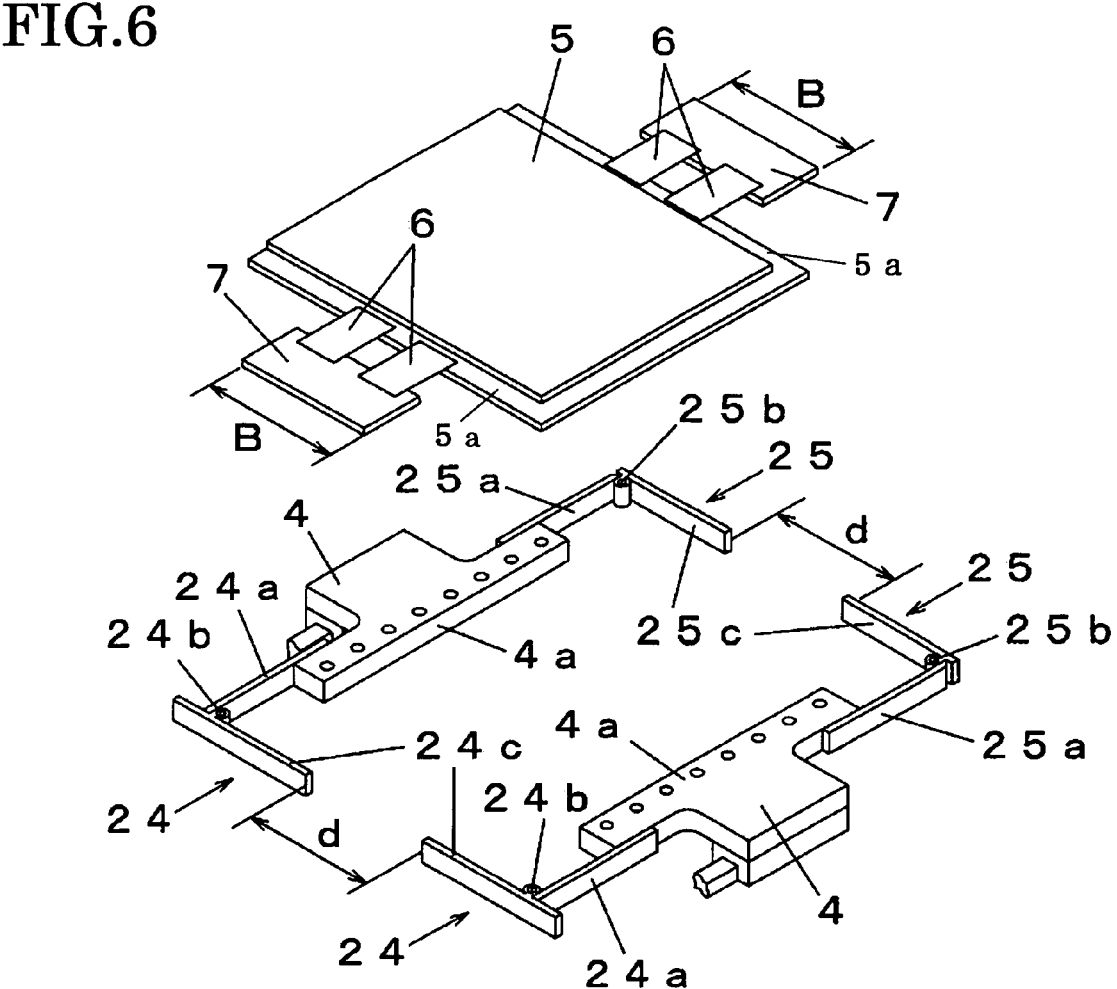
FIG. 6 is a perspective view of panel placing parts for the panel assembling device according to an exemplary embodiment of the present invention.
Figure 9:
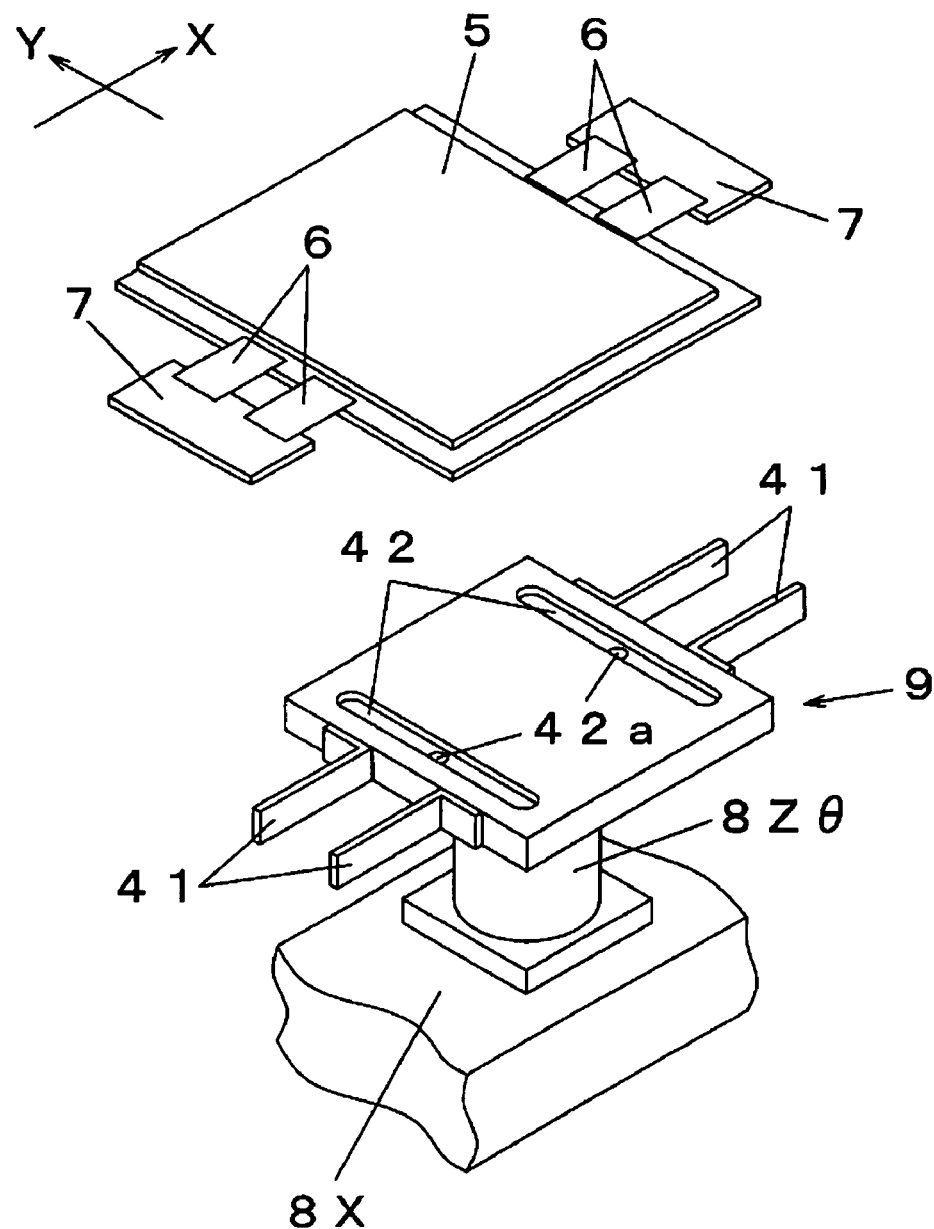
FIG. 9 is a perspective view of a panel holder for the panel assembling device according to an exemplary embodiment of the present invention.
Figure 10:
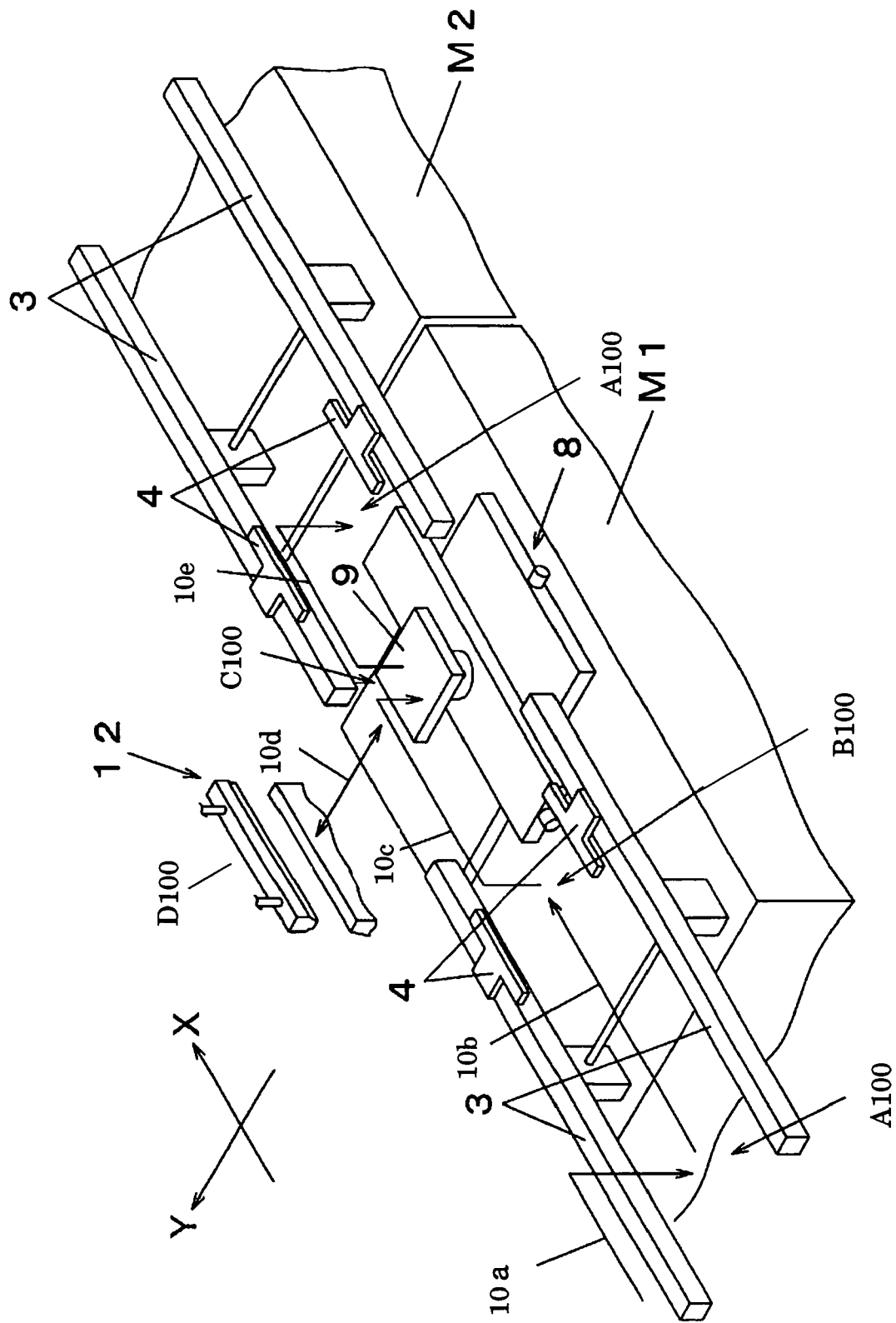
FIG. 10 is an explanatory diagram of the panel conveying action in the panel assembling device according to an exemplary embodiment of the present invention.

Next, a description is made for an embodiment of the present invention with reference to drawings. FIG. 1 is a plan view of a panel assembly line according to an exemplary embodiment of the present invention. FIG. 2 is a perspective view of a panel assembling device according to an exemplary embodiment of the present invention. FIG. 3 is a perspective view of a display panel to be assembled by the panel assembling device according to an exemplary embodiment of the present invention. FIG. 4 is a partially sectional view of the panel assembling device according to an exemplary embodiment of the present invention. FIG. 5 is a perspective view of a panel conveying mechanism for the panel assembling device according to an exemplary embodiment of the present invention. FIG. 6 is a perspective view of panel placing parts for the panel assembling device according to an exemplary embodiment of the present invention. FIG. 7 is an explanatory diagram of the action of a panel placing part for the panel assembling device according to an exemplary embodiment of the present invention. FIG. 8 is an explanatory diagram of the action of a panel positioning table for the panel assembling device according to an exemplary embodiment of the present invention. FIG. 9 is a perspective view of a panel holder for the panel assembling device according to an exemplary embodiment of the present invention. FIG. 10 is an explanatory diagram of the panel conveying action in the panel assembling device according to an exemplary embodiment of the present invention. FIG. 11 is an explanatory diagram of the panel receiving action in the panel assembling device according to an exemplary embodiment of the present invention. FIG. 12 is an explanatory diagram of the panel delivery action in the panel assembling device according to an exemplary embodiment of the present invention. FIGS. 13 and 14 are explanatory diagrams of the panel receiving and delivering action in the panel assembling device according to an exemplary embodiment of the present invention. FIG. 15 is a partial perspective view of a panel placing part in the panel assembling device according to an exemplary embodiment of the present invention.

First, a description is made for the panel assembly line with reference to FIGS. 1 and 2. In FIG. 1, first panel assembling device M1, second panel assembling device M2, and third panel assembling device M3 are respectively unitized devices with an identical structure. These devices have a function that joins a substrate for a driver to one side of a glass panel through a flexible connector such as a TAB or TCP. In this embodiment, by serially arranging a plurality of such unitized devices, a panel assembly line is composed. By sequentially connecting substrates mainly to the plural sides of a large glass panel by means of these plural unitized devices, a display panel is assembled.

A description is made for the makeup of a unitized device. Base 1 is annexed thereto with sub-base 1*a* adjacently in direction X (panel conveying direction). The top surface of sub-base 1*a* is provided thereon with part feeder 2 for storing and feeding substrate 7. Sub-base 1*a* and the front side of base 1 (the under side in FIG. 1) are arranged thereon with panel conveying mechanism 3 and panel positioning table 8 serially in direction X. Panel conveying mechanism 3 is equipped with a pair of placing tables 4 that horizontally move by means of carrier rails disposed in parallel. Panel conveying mechanism 3 holds the bottom surface of glass panel 5 (panel) at both ends thereof by placing tables 4 and conveys the panel from upstream (left side in FIG. 1) to downstream.

Panel conveying mechanism 3 is arranged so as to partially extend to the upstream side in each panel assembling device. These extended parts work as carry-in position A100 (refer to FIG. 10) where glass panel 5 is carried in from an upstream device as described later, and work as delivery position B100 (refer to FIG. 10) where glass panel 5 is delivered to panel positioning table 8 described later, at a downstream position of the carrier rails. As a result that placing tables 4 move along the conveying path from this carry-in position to the delivery position, glass panel 5 is conveyed. Therefore, panel conveying mechanism 3 works as a panel conveying means that conveys glass panel 5 along a conveying path from a carry-in position to a delivery position.

As shown in FIG. 2, panel positioning table 8 laminates Y-axis table 8Y, X-axis table 8X, and Zθ-axis table 8Zθ, with panel holder 9 attached on the top surface of Zθ-axis table 8Zθ. Panel holder 9 holds glass panel 5, being placed on placing tables 4, that has been conveyed to the aforementioned delivery position. Panel holder 9 moves in directions X, Y, Z, and θ by driving panel positioning table 8, receives glass panel 5 from panel conveying mechanism 3, and moves glass panel 5 to the working position for crimp joint 12 disposed behind panel positioning table 8, to perform positioning.

Therefore, panel positioning table 8 works as a panel receiving and moving means that receives glass panel 5, being held by panel holder 9, at the delivery position, and moves the panel to the working position for crimp joint 12. Panel conveying mechanism 3 and panel positioning table 8 compose a panel feeding device that feeds glass panel 5 to the working position for crimp joint 12.

The top surface of base 1 is disposed thereon with substrate positioning table 10 behind (topside in FIG. 1, and left side in FIG. 2) crimp joint 12. As shown in FIG. 2, substrate positioning table 10 stacks X-axis table 10X and Y-axis table 10Y. The top surface of Y-axis table 10Y is attached thereon with substrate holding table 11. Substrate 7 extracted from part feeder 2 by the substrate feeding mechanism (illustration omitted) is transferred to substrate holding table 11 and is held.

Substrate 7, a thin flexible substrate easy to bend, is difficult to handle and convey, and thus is conveyed and positioned with its bottom surface being borne by substrate holding table 11 in a clamped state. Then, substrate 7 held by substrate holding table 11 is conveyed to crimp joint 12 by Y-axis table 10Y, to be positioned with crimp joint 12. In other words, substrate positioning table 10 works as a substrate conveying means that conveys substrate 7 fed by substrate feeder 2 to crimp joint 12.

Crimp joint 12 is a joining means for joining glass panel 5 with substrate 7, disposing pressing tool 14 moving up and down by up/down pressing mechanism 13, on U-shaped frame 12a, and arranging bearing member 15 directly beneath pressing tool 14 (refer to FIG. 4). The side of bearing member 15 is disposed thereon with substrate recognition camera 16. When positioning glass panel 5 held by panel holder 9, glass panel 5 is located by imaging an identifying mark provided on glass panel 5 by substrate recognition camera 16.

Next, a description is made for glass panel 5 to be assembled, and the joining action of substrate 7 and glass panel 5 with reference to FIGS. 3 and 4. As shown in FIG. 3, glass panel 5, used for a display device such as a liquid crystal display, laminates two pieces of rectangular glass plates. Out of the outer edges of glass panel 5, edge 5a where one side of the glass plate is exposed is preliminarily bonded thereon with connector 6, extending from edge 5a, in an upstream process. The panel assembly process in this panel assembly line joins substrate 7 with the connecting terminals respectively provided on connector 6, through a joining tape made of an anisotropic conductive material.

Here, as glass panel 5 is a large-size panel, substrate 7 connected to edge 5a is relatively small to the size of glass panel 5, and thus substrate 7 is connected only to the central part of the side of edge 5a. In the joining action, as shown in FIG. 4, positioning is made for substrate 7 held by substrate holding table 11, with joining tape 17 preliminarily attached to, according to bearing member 15 by substrate positioning table 10. Subsequently, glass panel 5 is positioned by panel positioning table 8 so that respective connecting terminals of connector 6 and substrate 7 are positioned. Then, by moving down pressing tool 14 in this state, connector 6 preliminarily joined to glass panel 5 is joined to substrate 7 through joining tape 17.

Next, a description is made for the detailed structure of panel conveying mechanism 3 with reference to FIGS. 5, 6, and 7. As shown in FIG. 5, panel conveying mechanism 3 moves placing tables 4 reciprocably along a pair of carrier rails 3a arranged in parallel with the aforementioned conveying path. Frame 3b, with its reverse L-shaped cross section, is fixed to the top surface of base 1 with supports 3c provided at substantially central positions, and the left part extends upstream as aforementioned.

The top surface of frame 3b is disposed thereon with guide rail 20 throughout its length, and slider 21 slidably fitted to guide rail 20 is fastened to the bottom surface of placing table 4. Placing table 4 is equipped with panel supporting part 4a provided internally (centrally in the panel conveying path) extending from the base with slider 21 fastened to. Panel supporting part 4a has a shape with its both sides extending in direction X according to the side length of glass panel 5, and both sides of glass panel 5 are held and placed on panel supporting parts 4a so that the bottom surface of glass panel 5 is stably supported.

The top surface of panel supporting part 4a is provided thereon with adsorbing hole 22 connected to vacuum suction source 23. As a result of driving vacuum suction source 23, vacuum suction is performed through adsorbing hole 22, causing glass panel 5 placed on panel supporting parts 4a to be held by placing tables 4 owing to vacuum adsorption. Therefore, a pair of placing tables 4 are respectively provided movably along a pair of carrier rails 3a and work as a pair of panel placing parts holding the bottom surface of glass panel 5 placed on the top surface of the tables, at both ends of the panel. As a result of adopting a makeup that holds the bottom surface of glass panel 5 at both ends thereof in this way, large glass panel 5 can be conveyed being held stably.

A description is made for the drive mechanism of placing table 4. The front and rear ends of frame 3b pivotally supports pulleys 28a and 28b. Belt 27 hung on pulleys 28a and 28b is fastened to locking member 26 protruded on the bottom surface of placing table 4. Support 3c at one side is disposed thereon with motor 34, pulley 33 combined with the rotation axis of motor 34 rotarily drives pulley 31 through belt 32, and pulley 31 rotarily drives driving pulley 29 through driving shaft 30.

Belt 27 is revolving around driving pulley 29, and by driving motor 34 in forward and reverse directions, two belts 27 attached to two carrier rails 3a synchronously travel in forward and reverse directions of X, causing placing tables 4 to reciprocably move along carrier rails 3a synchronously. Motor 34, pulley 33, belt 32, pulley 31, driving shaft 30, driving pulley 29, pulley 28a, pulley 28b, belt 27, and locking member 26 work as a synchronously driving means that synchronously moves a pair of placing tables 4 along carrier rails 3a.

As shown in FIG. 6, panel supporting part 4a is provided with substrate supporting parts 24 and 25, each made of rod-shaped members combined, extending from both ends in direction X of panel supporting part 4a. Here, the attaching position of substrate supporting parts 24 and 25 is not limited to the above case, but any position is adequate as long as the parts are movable integrally with placing tables 4. Substrate supporting parts 24 and 25 are respectively composed of fixed members 24a and 25a extending from panel supporting part 4a in direction X; and supporting members 24c and 25c pivotally supported at the distal ends of fixed members 24a and 25a by rotating hinges 24b and 25b, and extending inwardly in direction Y. Here, d, the distance between the distal ends of two supporting members 24c and 25c facing each other, is set so as to be smaller than B, the length of substrate 7 in direction Y.

In a state of glass panel 5 being placed on placing tables 4, where glass panel 5 is bonded with substrate 7 extending from edge 5a, through connector 6, substrate 7 is positioned on the top surfaces of supporting members 24c and 25c, and supported at the bottom surface of substrate 7 by these supporting members. In this case, d, the distance between the distal ends of supporting members 24c and 25c, is smaller than B, the length of substrate 7 in direction Y as above-mentioned, thus enabling substrate 7 to be stably supported.

Figure 7A:
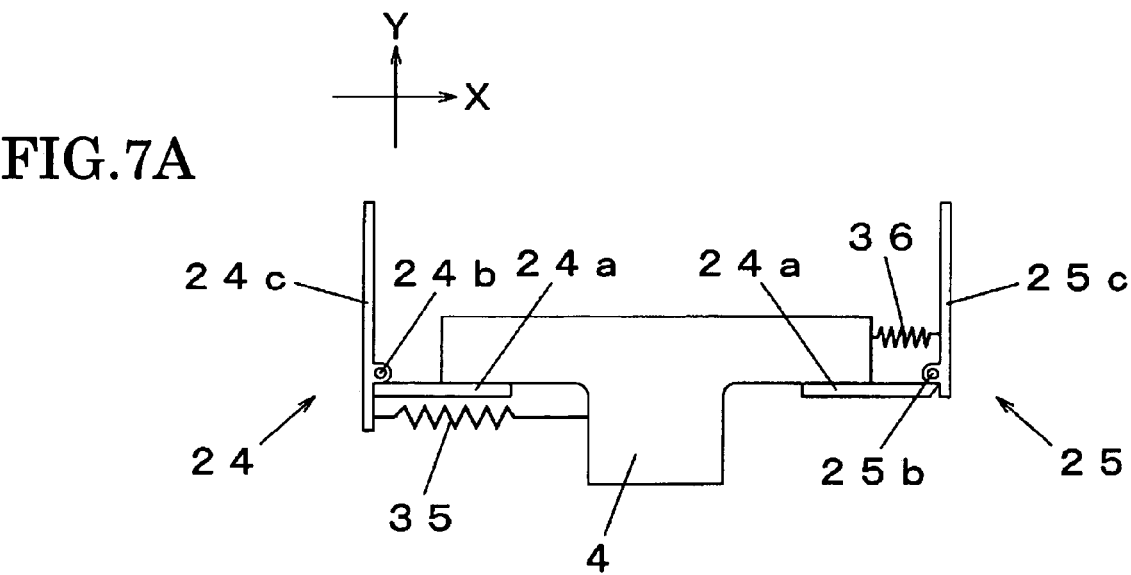
FIGS. 7A, 7B, and 7C are explanatory diagrams of the action of the panel placing part for the panel assembling device according to an exemplary embodiment of the present invention.
Figure 7B:
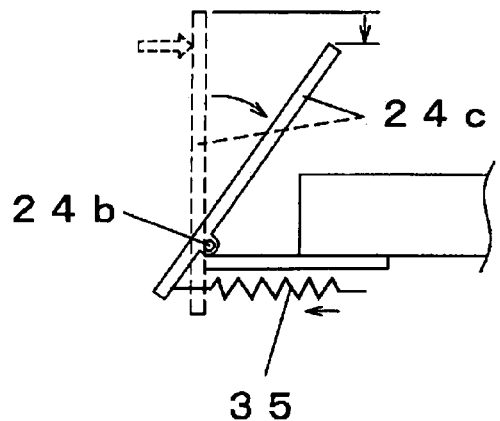
Figure 7C:
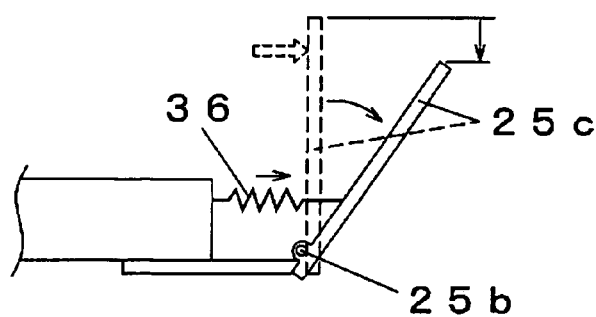

As shown in FIG. 7A, supporting member 24c is biased counterclockwise by tension spring 35 connecting the outer position of rotating hinge 24b to placing table 4. Supporting member 25c is as well biased counterclockwise by tension spring 36 connecting the inner position of rotating hinge 25b to placing table 4. As shown in FIG. 7B, with an external force acting on supporting member 24c from the left, supporting member 24c rotates clockwise against the biasing force of tension spring 35. This rotation displaces the distal end of supporting member 24c outward (direction Y) from the center of the panel conveying path. In the same way, with an external force acting on supporting member 25c from the left, supporting member 25c rotates clockwise against the biasing force of tension spring 36, as shown in FIG. 7C. This rotation as well displaces the distal end of supporting member 25c outward (direction Y).

That is, in the above-mentioned makeup, supporting members 24c and 25c are movable relatively to placing table 4. As a result that supporting members 24c and 25c are movable relatively to placing table 4 in this way, operational restrictions can be excluded due to touching of supporting members 24c and 25c with panel positioning table 8 in the panel conveying action to be hereinafter described.

Figure 8A:
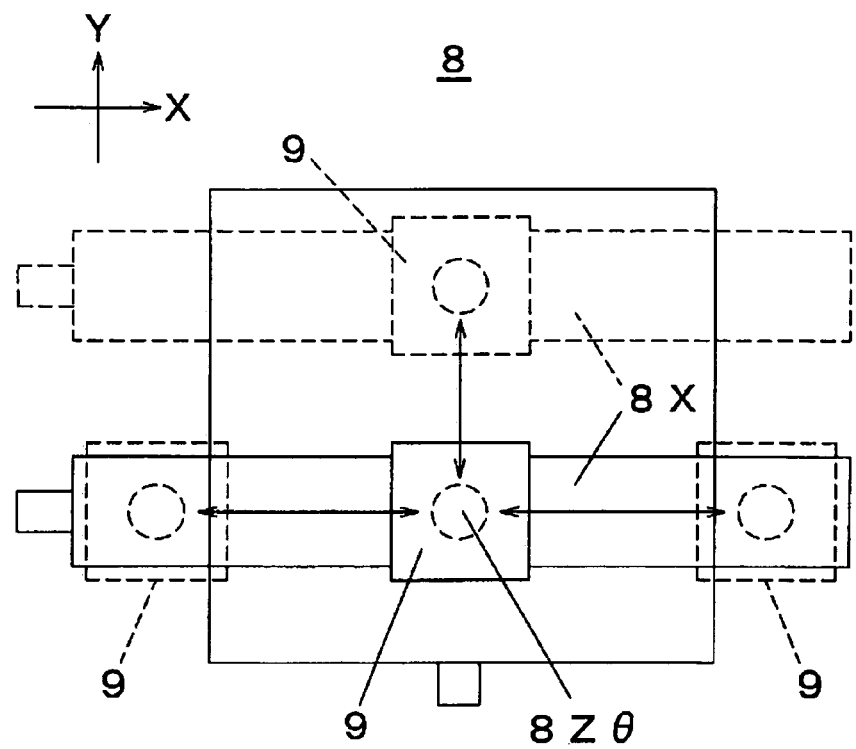
FIGS. 8A and 8B are explanatory diagrams of the action of the panel positioning table for the panel assembling device according to an exemplary embodiment of the present invention.
Figure 8B:
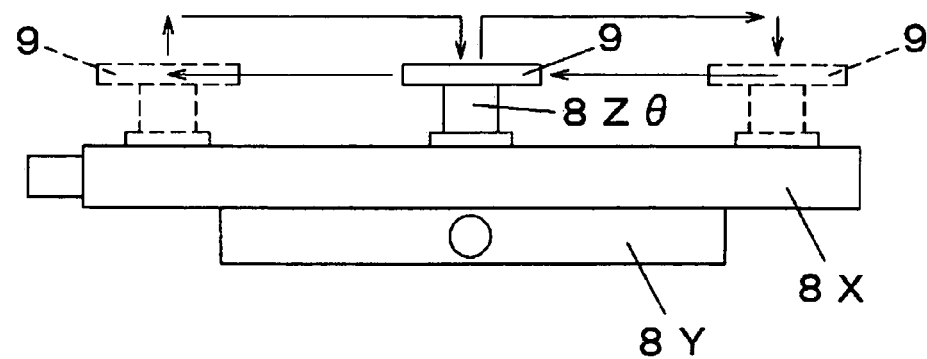

Next, a description is made for the functions of panel positioning table 8 and panel holder 9 with reference to FIG. 8. As shown in FIG. 8A, panel holder 9 provided on the top surface of Zθ-axis table 8Zθ drives X-axis table 8X and Y-axis table 8Y, resulting in being movable in directions X and Y. Meanwhile, as shown in FIG. 8B, combining the actions of X-axis table 8X and Zθ-axis table 8Zθ together enables a panel receiving action for receiving glass panel 5 and a panel delivery action for delivering glass panel 5.

As shown in FIG. 9, panel holder 9 is provided with substrate support arm 41 extending in direction X, in order to support substrate 7 connected to glass panel 5 placed on the top surface of panel holder 9 through connector 6, at the bottom surface of substrate 7. The top surface of panel holder 9 is provided thereon with adsorbing groove 42. Vacuum suction through suction hole 42a open to the inside of adsorbing groove 42 enables holding glass panel 5 owing to vacuum adsorption. Here, the flat surface of panel holder 9 has a shape allowing panel holder 9 to move up and down without interference in a space formed by two placing tables 4 shown in FIG. 6 facing each other, enabling a panel receiving action and a panel delivery action to be described hereinafter.

Next, a description is made for the conveying action of glass panel 5 in a panel assembly line with reference to FIGS. 10, 11, and 12. In panel conveying mechanism 3 provided for first panel assembling device M1, in FIG. 10, glass panel 5 is placed on placing tables 4 that have moved to carry-in position A100 extending upstream, along placing-on direction 10b by means of an upstream device. Then, as a result that placing tables 4 with glass panel 5 placed on move along conveying path 10b of panel conveying mechanism 3, glass panel 5 placed on placing tables 4 is positioned to delivery position B100 for panel positioning table 8.

Figure 11A:
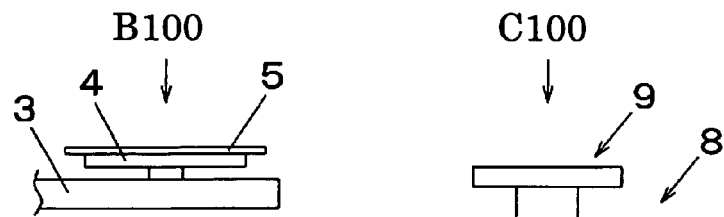
FIGS. 11A, 11B, 11C, and 11D are explanatory diagrams of the panel receiving action in the panel assembling device according to an exemplary embodiment of the present invention.

As a result of driving panel positioning table 8 in this state to have panel holder 9 perform a panel receiving action, glass panel 5 positioned at delivery position B100 moves to standby position C100 along moving direction 10c, in order to move to the central part of panel positioning table 8, namely to crimp joint 12. A description is made for further details about this panel receiving action with reference to FIG. 11. FIG. 11A illustrates a state in which placing tables 4 with glass panel 5 placed on and panel holder 9 at the low position are positioned at delivery position B100 and standby position C100, respectively.

Figure 11B:
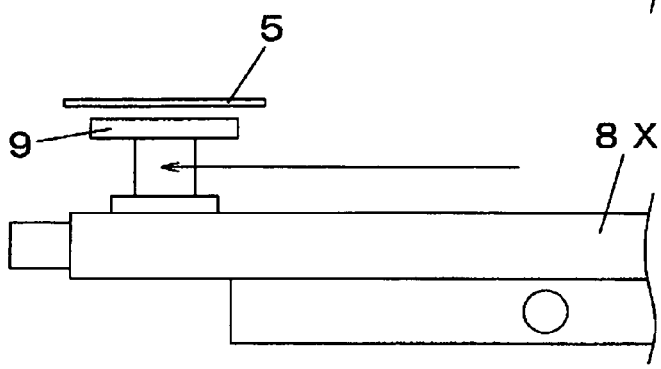
Figure 11C:
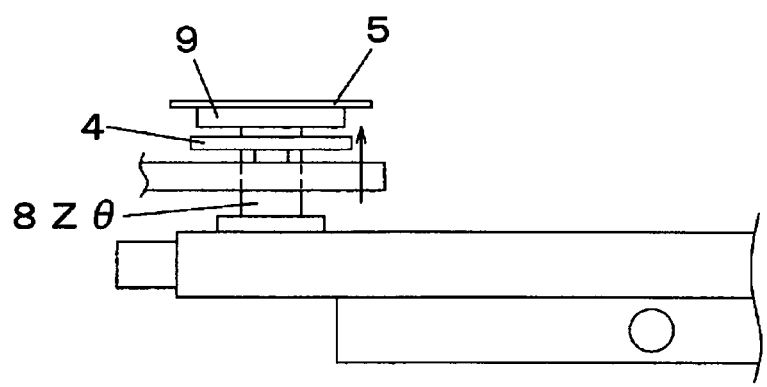
Figure 11D:
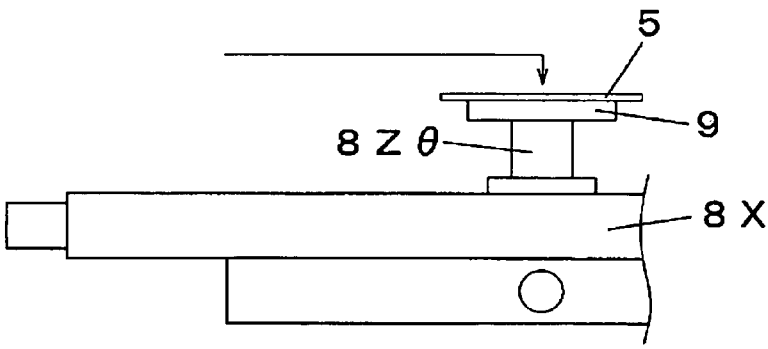
Figure 12A:
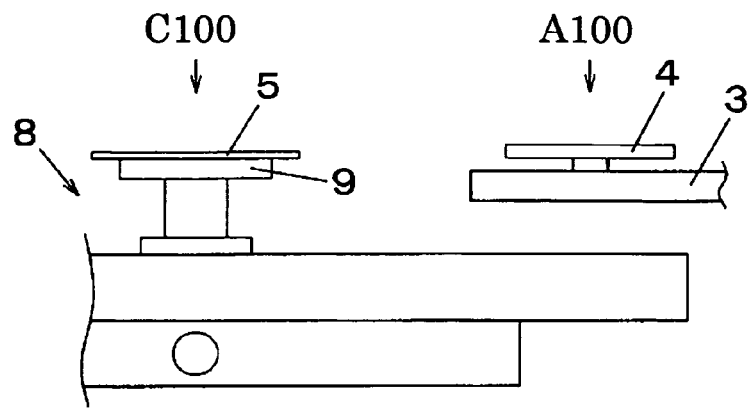
FIGS. 12A, 12B, 12C, and 12D are explanatory diagrams of the panel delivery action in the panel assembling device according to an exemplary embodiment of the present invention.
Figure 12B:
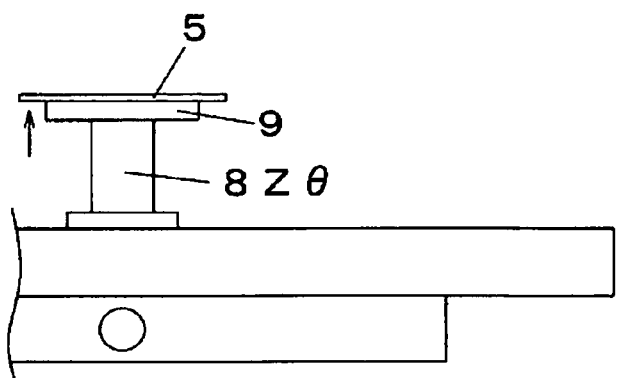
Figure 12C:
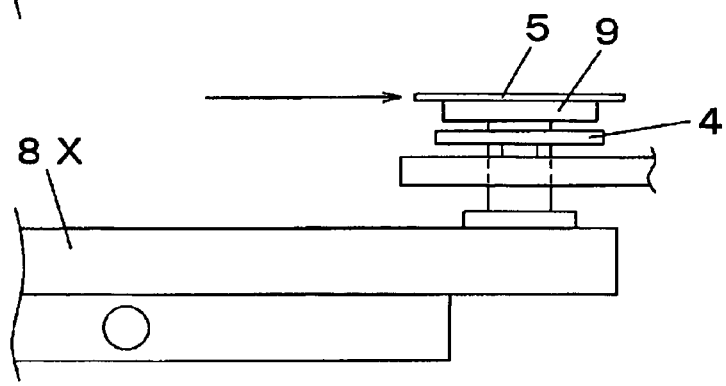
Figure 12D:
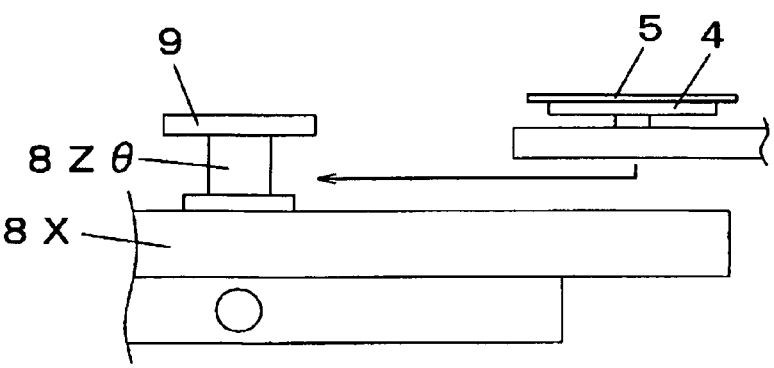

After then, as shown in FIG. 11B, X-axis table 8X is driven to move panel holder 9 to delivery position B100 to be positioned under glass panel 5. Subsequently, Zθ-axis table 8Zθ is driven to elevate panel holder 9, to hold glass panel 5 at the bottom surface thereof, having been placed on placing tables 4. This action causes panel holder 9 to receive glass panel 5 from placing tables 4. Next, as shown in FIG. 11D, by moving panel holder 9 to standby position C100 and then moving down panel holder 9, glass panel 5 is positioned to standby position C100.

After then, by driving Y-axis table 8Y to move panel holder 9 together with X-axis table 8X in whole in direction Y (refer to FIG. 8A), as shown in FIG. 10, glass panel 5 moves along moving direction 10d to working position D10, in order to join substrate 7 to glass panel 5 by crimp joint 12. Next, glass panel 5 having undergone the process shown in FIG. 4 returns to standby position C100 again, and then a panel delivery action is executed along moving direction 10e, the action that delivers glass panel 5 to carry-in position A100 set in panel conveying mechanism 3 of second panel assembling device M2.

A description is made for further details about this panel delivery action with reference to FIG. 12. FIG. 12A illustrates a state in which panel holder 9 holding glass panel 5 after the joining process and being at the low position is at standby position C100 for first panel assembling device M1, and a state in which placing tables 4 in an empty state are at carry-in position A100 for panel conveying mechanism 3 of second panel assembling device M2. Next, as shown in FIG. 12B, by driving Zθ-axis table 8Zθ, panel holder 9 is elevated, and further by driving X-axis table 8X as shown in FIG. 12C, panel holder 9, along with glass panel 5, is moved to carry-in position A100. Then, as a result that Zθ-axis table 8Zθ is driven to move down panel holder 9, panel holder 9 delivers glass panel 5 having been held to placing table 4, and subsequently, when panel holder 9 returns to standby position C100, the panel delivery action completes.

In the above-mentioned makeup, X-axis table 8X and Zθ-axis table 8Zθ both provided on panel positioning table 8 work as a receiving operation means that has panel holder 9 hold glass panel 5 on placing tables 4 positioned at delivery position B100, at the bottom surface of glass panel 5, by moving up and down panel holder 9 relatively to a pair of carrier rails 3a and by moving panel holder 9 horizontally in direction X; and also as a delivery action means that delivers glass panel 5 being held by panel holder 9, to placing tables 4 positioned at carry-in position A100 for second panel assembling device M2 downstream.

Further, Y-axis table 8Y provided at panel positioning table 8 works as a panel moving means that moves glass panel 5 held by panel holder 9, between standby position C100 and working position D100. In this embodiment, panel positioning table 8 with the above-mentioned makeup has thus three functions: a panel receiving function that receives glass panel 5 fed from an upstream device, a panel moving function that moves glass panel 5 to crimp joint 12, and a panel delivering function that delivers glass panel 5 after the processing to an downstream device. This makeup implements a more efficient conveying action in a panel assembling line arranged with plural panel assembling devices interlinked.

Figure 13A:
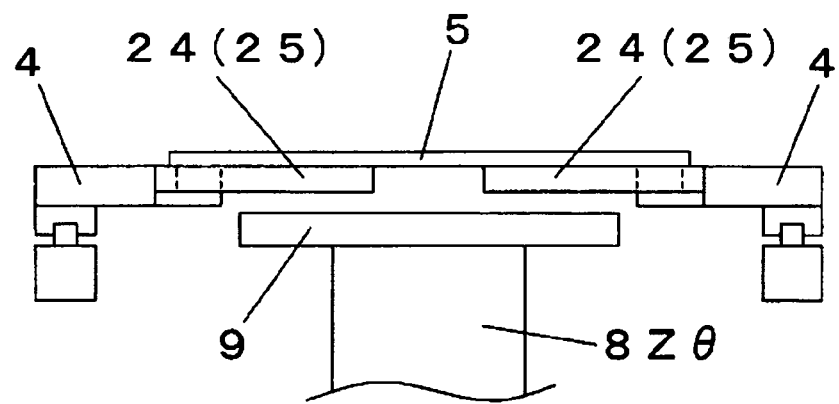
FIGS. 13A and 13B are explanatory diagrams of the panel receiving and delivering action in the panel assembling device according to an exemplary embodiment of the present invention.
Figure 13B:
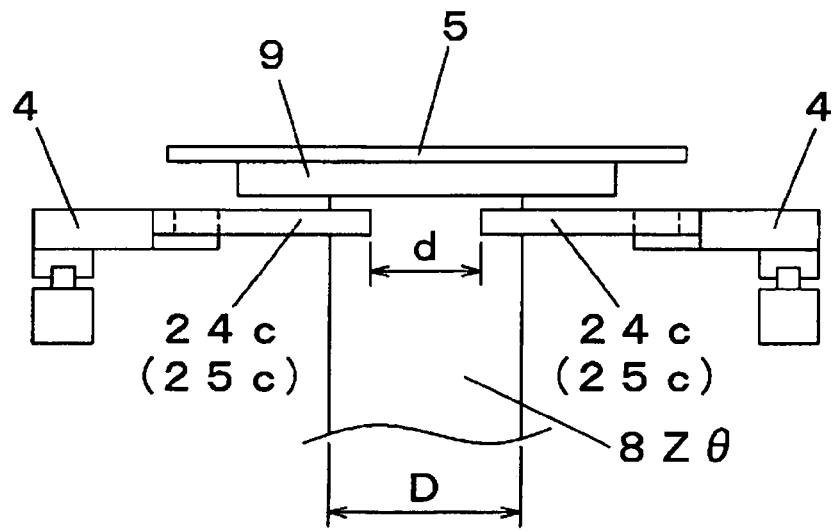

FIGS. 13 and 14 illustrate an up/down moving action of holder 9 when holding glass panel 5 placed on placing tables 4 held by panel holder 9 in a panel receiving action. More specifically, as shown in FIG. 13A, panel holder 9 is positioned below placing tables 4, and then as shown in FIG. 13B, by driving Zθ-axis table 8Zθ to elevate panel holder 9, glass panel 5 is held by panel holder 9 at the bottom surface of glass panel 5.

In this case, d, the distance between the distal ends of supporting members 24c, is to be set smaller than B, the width of substrate 7 (refer to FIG. 6) as above-mentioned, D, the diameter of Zθ-axis table 8Zθ, may be larger than d, the above-mentioned distance, depending on the size of substrate 7, as shown in FIG. 13B. In such a case, when moving panel holder 9 in direction X (vertical to the page in FIG. 13), Zθ-axis table 8Zθ touches supporting member 24c. In the same reason, Zθ-axis table 8Zθ touches supporting member 25c in a panel delivery action that places glass panel 5 held by panel holder 9 on placing tables 4 of a panel assembling device downstream.

Figure 14A:
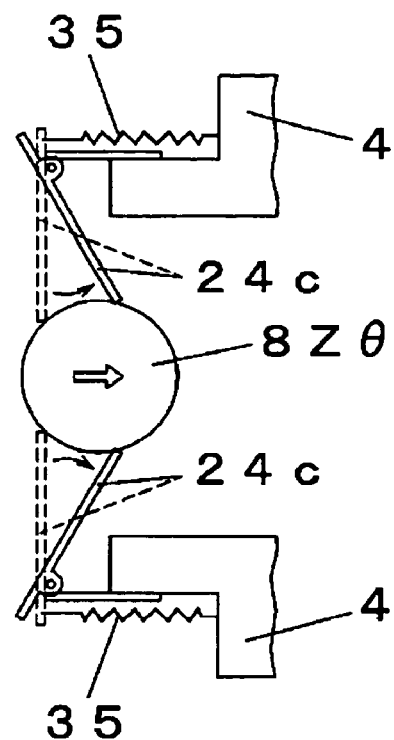
FIGS. 14A and 14B are explanatory diagrams of the panel receiving and delivering action in the panel assembling device according to an exemplary embodiment of the present invention.
Figure 14B:
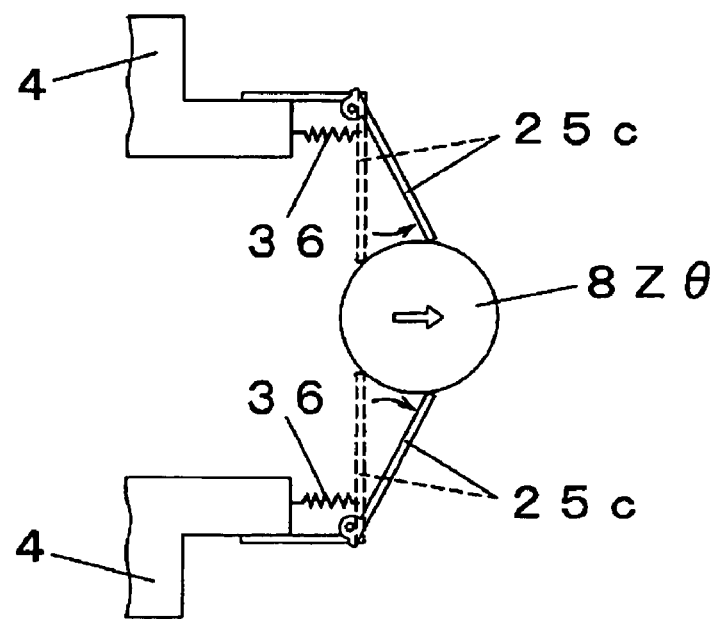

FIGS. 14A and 14B illustrate an action of supporting members 24c and 25c when Zθ-axis table 8Zθ of panel holder 9 touches supporting members 24c and 25c. Supporting members 24c and 25c are rotatable with an external force in the horizontal direction as aforementioned, and thus panel holder 9 is not prevented from horizontally moving in direction X, even if Zθ-axis table 8Zθ touches supporting members 24c and 25c.

That is, if the size of substrate 7 is relatively smaller than the long side of glass panel 5, as in a case when a large-size panel is to be produced, supporting members 24c and 25c need to be faced each other with a small distance (d) according to the size of substrate 7, and thus it is difficult to prevent Zθ-axis table 8Zθ from touching supporting members 24c and 25c. Even in such a case, the above-mentioned makeup enables executing the aforementioned panel receiving action and panel delivery action without trouble. Here, if an arrangement is made for supporting members 24c and 25c so as to be destructed when overpowered, with supporting members 24c and 25c formed with resin or the like and incised, a case is desirably avoided where precision Zθ-axis table 8Zθ is overpowered.

In the above-mentioned makeup, supporting members 24c and 25c are movably provided relatively to placing tables 4, and as a result that Zθ-axis table 8Zθ that has panel holder 9 perform a panel receiving action touches supporting members 24c and 25c, a movement relative to placing tables 4 is performed. More specifically in this example, Zθ-axis table 8Zθ, a receiving operation means, doubles as a supporting member moving means that moves supporting members 24c and 25c relatively to placing tables 4. This receiving operation means touches supporting members 24c and 25c to perform the aforementioned relative movement.

Figure 15A:
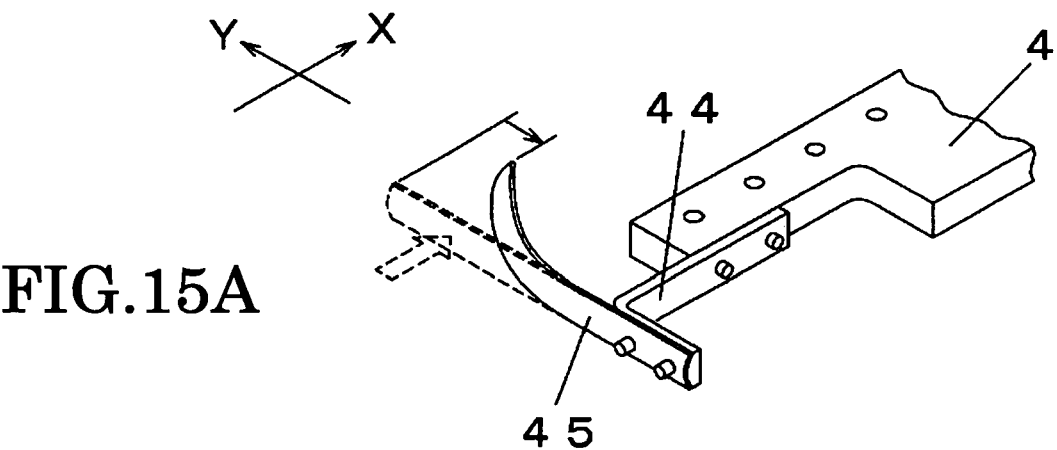
FIGS. 15A and 15B are partial perspective views of the panel placing part in the panel assembling device according to an exemplary embodiment of the present invention.

Here, as a method of composing a supporting member supporting substrate 7 so as to be movable relatively to placing tables 4, blade spring member 45, an elastic member made of a thin steel spring formed in a convex cross section, as shown in FIG. 15A, may be used as a supporting member. In this method, blade spring member 45 is extended from placing tables 4 through fixed member 44. Consequently, with an external force acting in direction X, blade spring member 45 deforms in direction X, causing the distal end to displace in direction Y to implement the aforementioned relative movement.

Figure 15B:
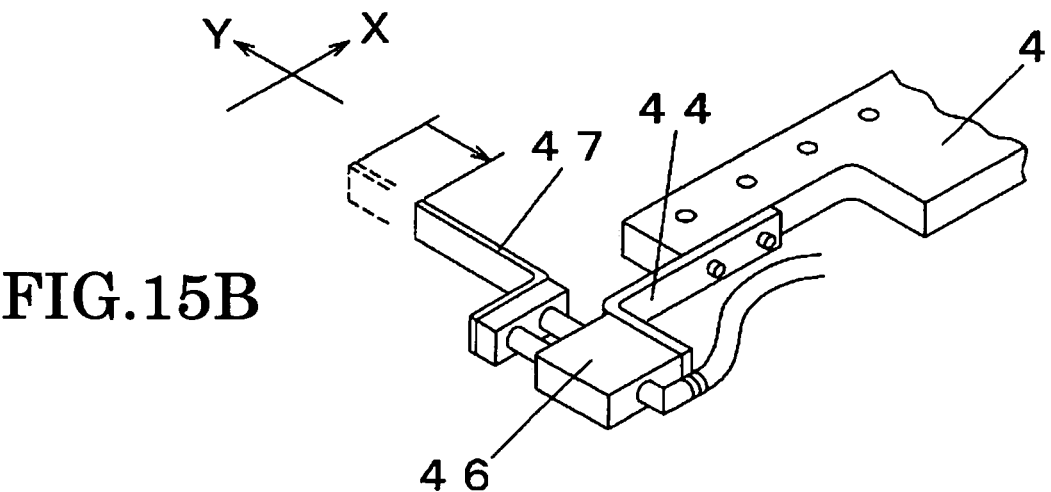

Alternatively, as shown in FIG. 15B, a makeup may be adopted that is independently provided with a supporting member moving means that has the supporting member perform the aforementioned relative movement. More specifically, air cylinder 46 as a supporting member moving means is attached to fixed member 44 fixed to placing tables 4, and supporting member 47 is mounted to the rod of air cylinder 46. In this example, by driving air cylinder 46 to project and recess supporting member 47, the projection position of the distal end of supporting member 47 in direction Y changes, performing a relative movement in the same way as in the aforementioned example.

In a panel assembling method that assembles a display panel by joining substrate 7 to glass panel 5 by means of crimp joint 12 in the above-mentioned panel assembling device, the following operational processes are executed. That is, glass panel 5 fed from an upstream device is conveyed along a conveying path from carry-in position A100 to delivery position B100 (panel conveying process); then glass panel 5 at delivery position B100 is received, being held by panel holder 9, and moved to working position D100 for crimp joint 12 (panel receiving and moving process); and glass panel 5 is joined with substrate 7 by crimp joint 12 (joining process).

Then, in the panel conveying process, a pair of panel placing parts 4 are moved synchronously along the carrier rails 3a, with the bottom surface of glass panel 5 being held at both ends thereof, by means of a pair of panel placing tables 4, each provided movably along a pair of carrier rails 3a disposed substantially in parallel with the conveying path. In the panel receiving and moving process, by moving panel holder 9 up/down and horizontally relatively to a pair of carrier rails 3a, a panel receiving action is executed that has panel holder 9 hold glass panel 5 on placing tables 4 positioned at delivery position B100, at the bottom surface of glass panel 5.

Glass panel 5 having undergone the joining process is bonded with substrate 7 in a state of extending from edge 5a, and in a conveying process targeting glass panel 5 in this state, substrate 7 is supported from below by supporting members 24c and 25c provided on placing tables 4. In a panel receiving action, as a result that Zθ-axis table 8Zθ, a receiving operation means that has panel holder 9 perform a panel receiving action, touches supporting members 24c and 25c, supporting members 24c and 25c move relatively to placing tables 4.

INDUSTRIAL APPLICABILITY

A panel assembling device and panel assembling method according to the present invention have an advantage in which a large panel can be conveyed stably, which is useful in panel assembling fields where a display panel is assembled by joining a substrate to a panel, and thus has a high industrial applicability.

The invention claimed is:

1. A panel feeding method that feeds a panel to a working position, comprising:
 a panel conveying process that conveys the panel along a conveying path from a receiving position to a delivery position, the conveying path comprising a pair of carrier rails disposed substantially in parallel to the conveying path; and
 a panel receiving and moving process that receives the panel at the delivery position by a panel holder by holding the panel, and moves the panel to the working position, via a standby position, the panel being assembled at the working position, wherein the receiving position, the delivery position and the standby position are located in order of the receiving position, the delivery position and the standby position from an upstream of the conveying path, wherein the panel conveying process, by means of a pair of panel placing parts each provided slidably on the pair of carrier rails, synchronously moves the pair of panel placing parts on the carrier rails, with the panel being held at both ends of bottom surface thereof, from the receiving position to the delivery position, wherein a direction X is defined as a direction parallel to the pair of carrier rails, a direction Z is defined as a direction perpendicular to a plane including the pair of carrier rails and a direction Y is defined as a direction perpendicular to the directions X and Z, wherein the panel receiving and moving process, by moving the panel holder from the standby position to the delivery position in the direction X horizontally relative to the pair of carrier rails and then moving the panel holder up along the Z direction, executes a panel receiving action, the panel receiving action including holding the panel on the panel placing part positioned at the delivery position, by the panel holder at a bottom surface of the panel, the panel holder being separated from the pair of carrier rails and movable along the directions X, Y and Z, and wherein in the panel receiving and moving process, after the panel holder is further moved along the direction X from the delivery position to the standby position, the panel held by the panel holder is moved to the working position by further moving the panel holder in the direction Y.

2. The panel feeding method as claimed in claim 1, wherein the panel is bonded with a substrate in a state of extending from an edge of the panel, and the panel conveying process supports the substrate from below by means of a supporting member provided on the panel placing parts.

3. The panel feeding method as claimed in claim 2, wherein the panel receiving action moves the supporting member relative to the panel placing parts.

4. The panel feeding method as claimed in claim 3, wherein the panel receiving action performs the relative movement as a result that the receiving operation means that has the panel holder perform the panel receiving action touches the supporting member.

5. The panel feeding method as claimed in claim 1, wherein the working position is positioned along the direction Y and apart from the pair of carrier rails and at an outside of the pair of carrier rails.

6. The panel feeding method as claimed in claim 5, wherein the panel is jointed with a substrate at the working position.

* * * * *